United States Patent
Barrell et al.

(10) Patent No.: US 10,990,289 B2
(45) Date of Patent: Apr. 27, 2021

(54) DATA STORAGE SYSTEMS USING TIME-BASED READ AHEAD

(71) Applicant: SEAGATE TECHNOLOGY LLC, Cupertino, CA (US)

(72) Inventors: Michael Barrell, Longmont, CO (US); Zachary D. Traut, Denver, CO (US); Scott Gergely, Arvada, CO (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 16/146,827

(22) Filed: Sep. 28, 2018

(65) Prior Publication Data

US 2020/0104045 A1    Apr. 2, 2020

(51) Int. Cl.
*G06F 3/06* (2006.01)
*G06F 12/0862* (2016.01)
*G06F 12/0868* (2016.01)

(52) U.S. Cl.
CPC ............ *G06F 3/061* (2013.01); *G06F 3/0653* (2013.01); *G06F 3/0659* (2013.01); *G06F 3/0689* (2013.01); *G06F 12/0862* (2013.01); *G06F 12/0868* (2013.01); *G06F 2212/1024* (2013.01); *G06F 2212/602* (2013.01)

(58) Field of Classification Search
CPC ....... G06F 3/061–0613; G06F 12/0862; G06F 16/24568
See application file for complete search history.

(56) References Cited

U.S. PATENT DOCUMENTS

| | | | | |
|---|---|---|---|---|
| 6,040,866 | A * | 3/2000 | Chen | H04N 21/23406 348/419.1 |
| 7,822,731 | B1* | 10/2010 | Yu | G06F 12/0862 707/705 |
| 9,247,523 | B1* | 1/2016 | Bhatia | H04W 4/02 |
| 9,998,926 | B1* | 6/2018 | Gale | H04L 67/18 |
| 2003/0126116 | A1* | 7/2003 | Chen | G06F 12/0862 |
| 2006/0245394 | A1* | 11/2006 | Baba | H04W 36/0011 370/331 |
| 2014/0351527 | A1 | 11/2014 | Trutt et al. | |
| 2015/0281288 | A1* | 10/2015 | Levinson | H04L 47/41 709/219 |
| 2016/0021190 | A1* | 1/2016 | Vuyyuru | H04L 67/18 709/223 |
| 2016/0065995 | A1* | 3/2016 | Phillips | H04N 21/238 725/62 |
| 2018/0007161 | A1* | 1/2018 | Hwang | H04L 67/2847 |

FOREIGN PATENT DOCUMENTS

WO    WO 94/18771 A1    8/1994

* cited by examiner

*Primary Examiner* — Nicholas J Simonetti
(74) *Attorney, Agent, or Firm* — Mueting Raasch Group (57) ABSTRACT

A data storage system includes a host system configured to provide an I/O request stream and a data storage subsystem. The data storage subsystem has a data storage device and a processor. The processor is configured to provide streaming data in response to the I/O request stream, determine a current streaming rate of the I/O request stream, and determine a time-based read ahead size based on a time ahead duration and the current streaming rate of the I/O request stream. The time-based read ahead size may be updated while streaming, for example, after a delay period.

21 Claims, 11 Drawing Sheets

Fig. 3 Data storage system

Fig. 4 Host data stream

Fig. 6a Data stream example

Fig. 6b burst parameters

| | sequential I/O burst 616 | | | | | | | | | | |
|---|---|---|---|---|---|---|---|---|---|---|---|
| | burst 0 616a | | burst 1 616b | | burst 2 616c | | burst 3 616d | | burst 4 616e | | burst 5 616f |
| burst length 620 | 2 MB | | 1 MB | | 6 MB | | 2 MB | | 1 MB | | 2 MB |
| time since last burst ($t_{lb}$) 624 | | 200 ms | | 30 ms | | 60 ms | | 120 ms | | 200 ms | |

←————————time————————→

Fig. 7 Outstanding I/Os per burst

Fig. 8  Logical volume, VDISK, and storage device metadata

DATA STORAGE SYSTEMS USING TIME-BASED READ AHEAD

The present disclosure relates to data storage systems. In particular, the present disclosure relates to data storage systems that provide data in response to an I/O request stream.

SUMMARY

The techniques of this disclosure generally relate to providing a data storage system that uses time-based read ahead to cache streaming data in response to receiving a stream of I/O requests. Using time-based read ahead, a read ahead size may be determined that is targeted to a desired stream performance, efficiently utilizes cache memory, and adapts to changing streaming rates.

In one aspect, the present disclosure provides a data storage system. The data storage system includes a host system configured to provide an I/O request stream. The data storage system also includes a data storage subsystem comprising a data storage device and a processor. The processor is configured to provide streaming data in response to the I/O request stream. The processor is also configured to determine a current streaming rate of the I/O request stream. The processor is also configured to determine a time-based read ahead size based on a time ahead duration and the current streaming rate of the I/O request stream.

In another aspect, the present disclosure provides a method. The method includes providing data in response to an I/O request stream. The method also includes determining a current streaming rate of the I/O request stream. The method also includes determining a time-based read ahead size based on a predetermined time ahead duration and the current streaming rate of the I/O request stream.

In another aspect, the present disclosure provides a storage subsystem. The storage subsystem includes a data storage device comprising data. The storage subsystem also includes a processor configured to provide data in response to an I/O request stream. The processor is also configured to determine a current streaming rate of the I/O request stream. The processor is also configured to determine a time-based read ahead size based on a predetermined time ahead duration and the current streaming rate of the I/O request stream.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

DETAILED DESCRIPTION

This disclosure relates to data storage systems that use a time-based read ahead to provide data in response to a sequential input/output (I/O) request stream. Although reference is made herein to sequential I/O request streams, the read ahead technique may be used with any suitable I/O request stream. Various other applications will become apparent to one of skill in the art having the benefit of the present disclosure.

There is an increasing need to store digital files, documents, pictures, images and other data. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into redundant array of independent disks (RAID) or storage device read or write requests. Many storage controllers store read and write data in cache memories included as part of the storage controllers. Cache memories are typically small compared to external storage devices such as hard drives, and generally orders of magnitude faster. However, cache memory costs significantly more per byte than storage devices, and therefore cache memory size is often correspondingly small to be cost effective.

Host systems interact with data storage subsystems by providing either random or sequential I/O requests. Sequential I/O requests may be described as I/O request streams. In the case of sequential I/O requests, it may be desirable for storage controllers to handle as many different sequential I/O streams as possible to maximize performance. Sequential I/O streams include a series of generally consecutive I/O requests directed to the same storage device, logical volume, or virtual disk (VDisk). While some sequential I/O streams may be read requests, other sequential I/O streams may be write requests.

In media streaming applications, when a frame of data is read, many I/O requests are generated to the data storage subsystem where the media file, or data, is stored. These I/O requests cause the storage system to retrieve the corresponding data from a storage device, such as a hard disk, which may have inconsistent response times due to various factors. A "read ahead" may be performed to retrieve the data from the disk in anticipation of the host needing the data. As used herein, "read ahead" refers to the retrieving data from the data storage device or subsystem, for example, using a storage controller, before the data is needed by the host system. Using read ahead may allow the data storage subsystem to experience, or absorb, the latency so that the host does not. Read ahead may be configured to be a predetermined size, for example, based on a fixed cache size or based on the burst size of the host requests.

However, the amount of read ahead, or read ahead size, that is needed to "soak up" or cover the range of disk latencies may be dependent upon the rate of the I/O requests. The predetermined size may be too small at times, which may result in reduced read performance (e.g., stuttering or buffering), or may be too large at times, which may inefficiently utilize the small amount of cache memory available. Further, while a static read ahead cache size may be efficient for host computers that provide a relatively constant stream of read requests, this is often not the case for host computers that issue bursts of read requests to storage controllers or that use different streaming speeds. A burst is a consecutive group of sequential host read requests from the same host computer. A burst of host read requests creates a high initial queue depth. If the burst of host read requests adds up to more than the static read ahead size of the read cache, the host stream will eventually "catch up" with read ahead and cache misses may occur with every burst, thus lowering read performance.

It may be beneficial to provide a data storage system that uses a read ahead to improve performance during streaming I/O requests. It may also be beneficial to provide a read ahead technique that efficiently utilizes cache memory for various streaming rates.

In general, this disclosure provides a data storage system that sets a read ahead size (X) based on the current speed, or rate, of an I/O stream (V) and a configurable time ahead duration (Y), for example, according to $X=V \times Y$, in contrast to setting a read ahead size based on a cache memory size or burst size of host requests. In this manner, the read ahead size (X) may be described as a time-based read ahead. The time ahead duration may be set based streaming parameters and/or storage subsystem parameters. In some embodiments, this disclosure provides a data storage system having a host system configured to provide an I/O request stream and a data storage subsystem comprising a data storage device and a processor. The processor may be configured to provide streaming data in response to the I/O request stream, determine a current streaming rate of the I/O request stream, and determine a time-based read ahead size based on a time ahead duration and the current streaming rate of the I/O request stream.

Systems of the present disclosure provide efficient use of storage controller memory resources for sequential I/O read and write streams while improving the performance of I/O streams. All storage controllers have a fixed amount of onboard memory resources at any given time. The systems allocate the limited memory resources to the sequential I/O streams using a time-based read ahead to benefit the most from such limited memory resources. By improving sequential I/O resource allocation from host computer sequential read and write requests in a storage controller, the cost of manufacturing storage controllers may be minimized due to being able to use less onboard memory resources. In systems where a storage controller is coupled to multiple host computers, filling a cache memory with large amounts of data for a specific host computer may prevent other host computers from utilizing the storage controller memory resources, severely limiting read and/or write performance to the other host computers.

A host computer issues I/O read and write data requests based on the applications and other programs executed by that host computer. In most cases, the applications and other programs currently being executed by one host computer is different than the applications and other programs being executed by a different host computer. Each host computer therefore issues a different set of sequential read or write requests, which are known as a host stream. A given host computer can issue multiple host streams.

As used herein, the term "tail latency" refers to a $99^{th}$ percentile, or higher percentile, response latency. For example, in 99 of 100 latencies are less than or equal to a 99% tail latency (e.g., two 9's) or 99,999 out of 100,0000 latencies are less than or equal to a 99.999% tail latency (e.g., five 9's).

As used herein, the term "frame" refers to a unit of information defined by a protocol used to transfer data. A frame may include, but is not limited to, a frame in a video, a fiber channel frame, an ethernet packet, an InfiniBand packet, a Serial ATA (SATA) transaction, or a SATA frame. For example, a frame in a video may refer to one still image of the video.

One or more of the components of a computer or system described herein may include a controller having a processor, such as a central processing unit (CPU), computer, logic array, or other device capable of directing data coming into or out of such controller. For example, the controller may include one or more computing devices having memory, processing, and communication hardware. The controller may include circuitry used to couple various components of the controller together or with other components operably coupled to the controller. The functions of the controller may be performed by hardware and/or as computer instructions on a non-transient computer readable storage medium.

The processor of the controller may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and devices may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be clear that the controller functionality as described herein may be implemented in any manner known to one skilled in the art having the benefit of this disclosure.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

Figure 8:
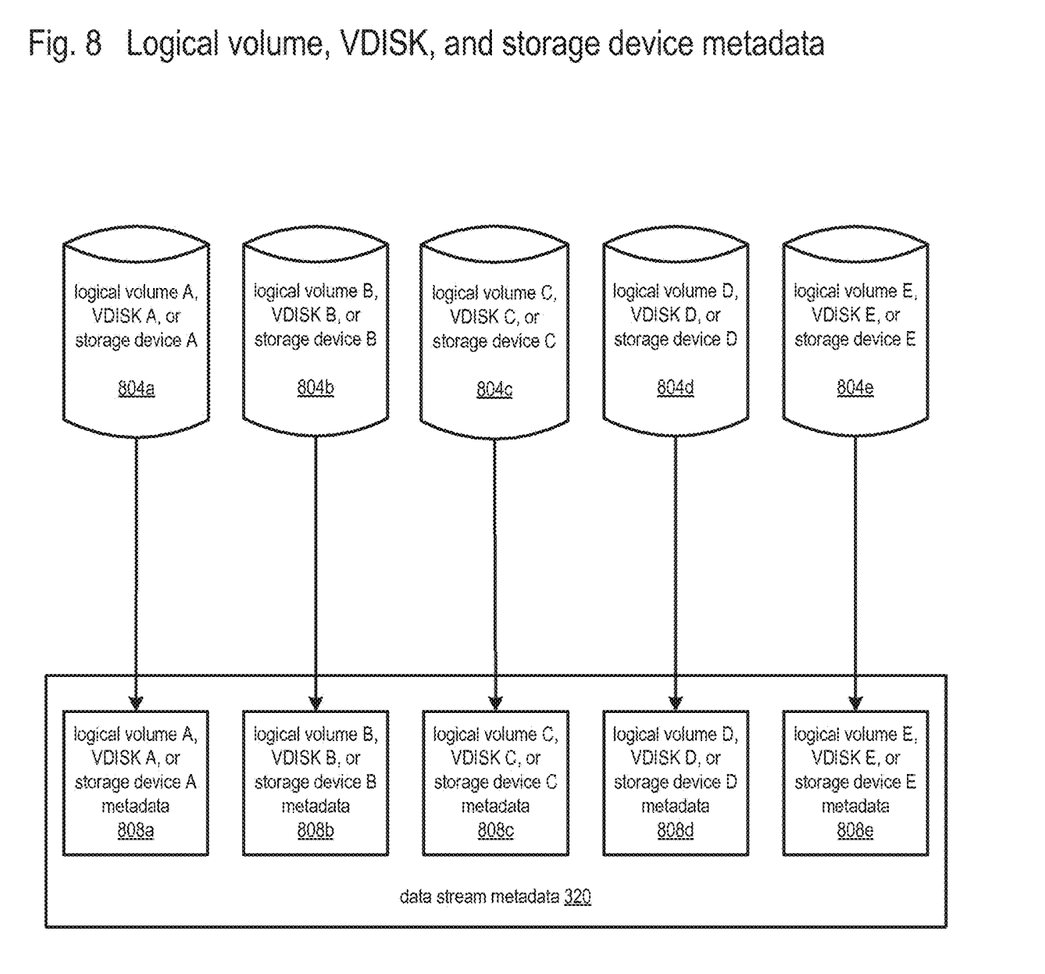
FIG. 8 is a diagram illustrating logical volume, VDisk, and storage device metadata in accordance with embodiments of the present disclosure.
Figure 9:
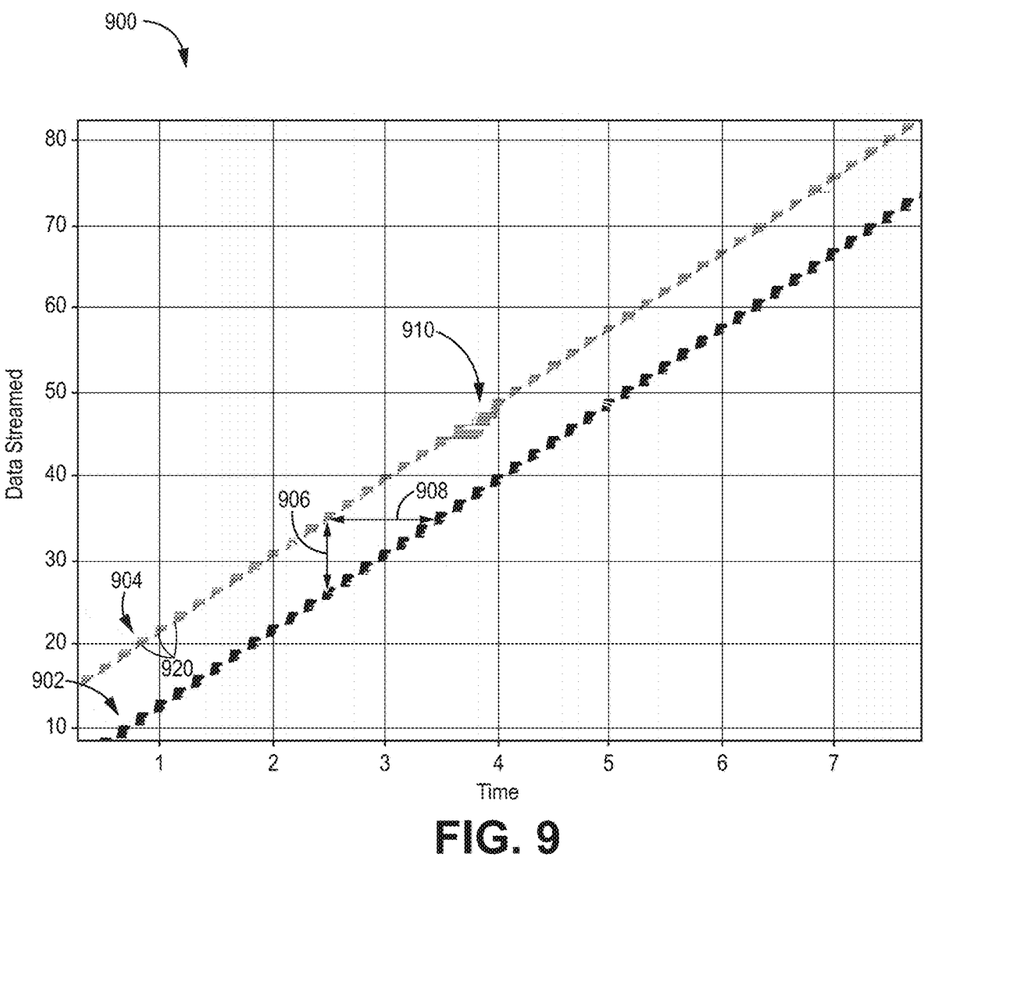
FIG. 9 is a graph illustrating a normalized graph of data streamed versus time using time-based read ahead in accordance with embodiments of the present disclosure.
Figure 10:
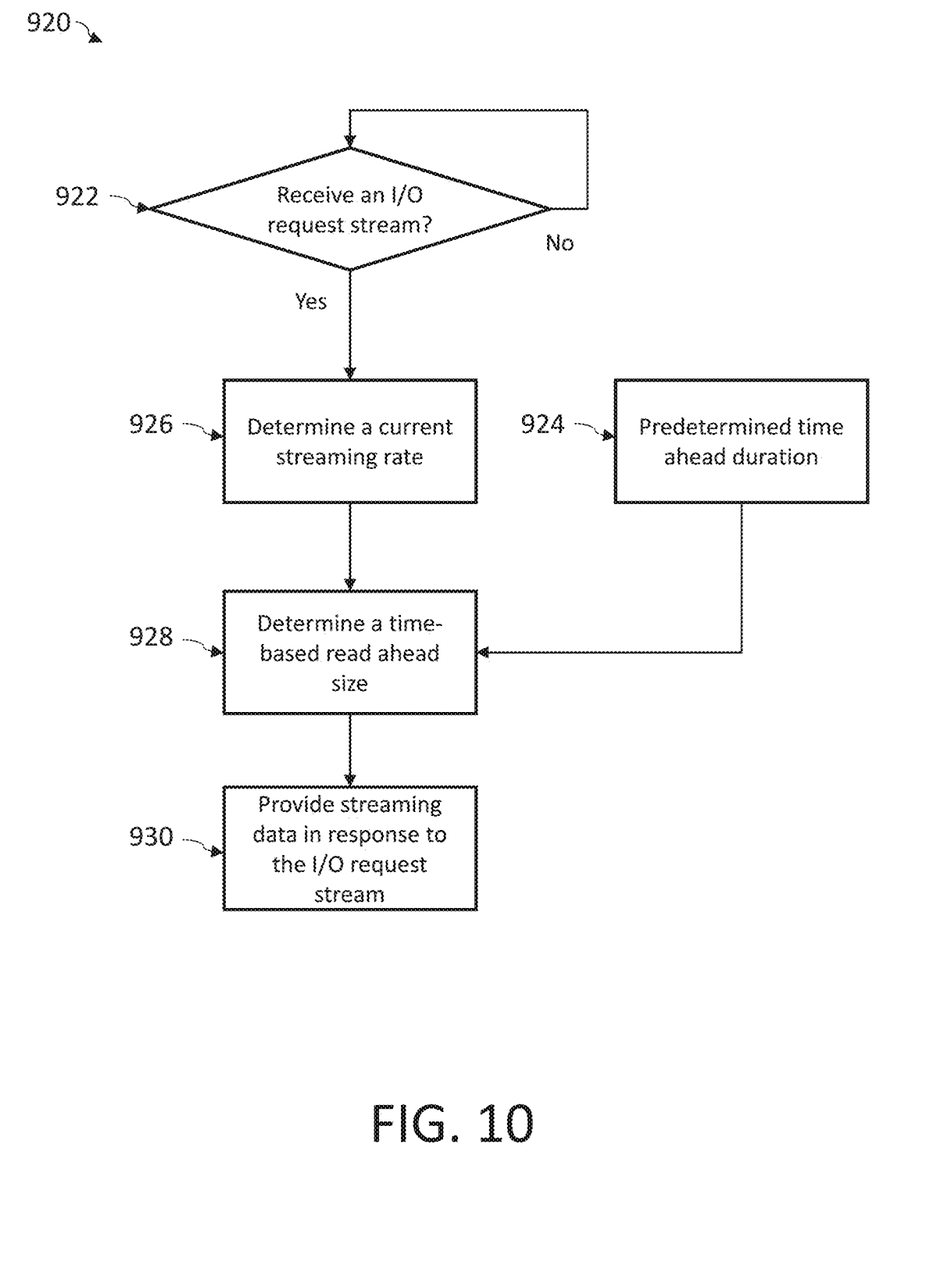
FIG. 10 is a flowchart of a method of using a time-based read ahead in accordance with embodiments of the present disclosure.
Figure 11:
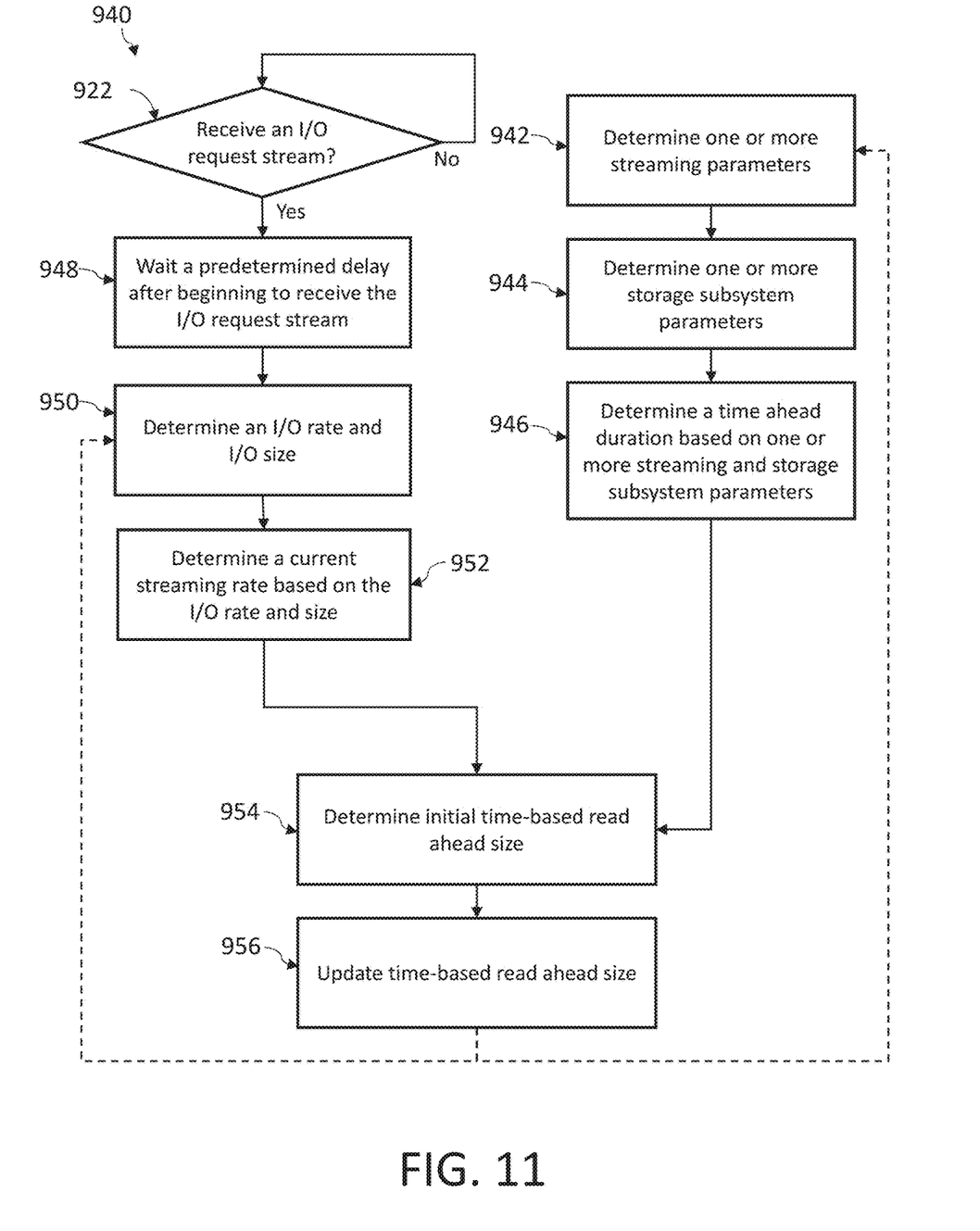
FIG. 11 is a flowchart of one particular method of using a time-based read ahead in accordance with embodiments of the present disclosure.

In general, the techniques of the present disclosure shown in FIGS. 9-11 may be used with any suitable data storage system, such as the data storage systems shown in FIGS. 1a-3, for any suitable I/O request stream, such as the streams shown in FIGS. 4-6a. The data storage system and streams may be configured in any suitable manner, for example, as shown in FIGS. 6b-8.

FIGS. 1a-3 illustrate various data storage systems that may use a time-based read ahead in accordance with various embodiments of the present disclosure. In general, the time-based read ahead technique may be used with any suitable data storage system, which may be non-host based or host based, to help manage the transfer to streamed data from a data storage device or subsystem to the host.

Figure 1A:
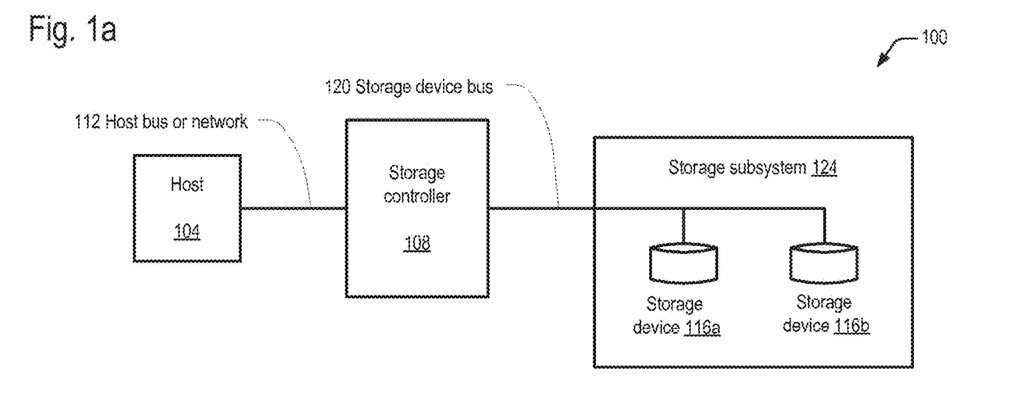
FIG. 1a is a block diagram illustrating components of a first non-host-based data storage system in accordance with embodiments of the present disclosure.

Referring now to FIG. 1a, a block diagram illustrating components of a first non-host-based data storage system 100 in accordance with embodiments of the present disclosure is shown.

The data storage system 100 includes one or more host computers 104. Host computer 104 is generally a server but could also be a desktop or mobile computer. Host computer 104 may execute application programs that generate read and write requests to storage controller 108 over host bus or network 112. Host bus or network 112 in one embodiment is a bus, such as SCSI, FC-AL, USB, Firewire, SSA, SAS, SATA, or Infiniband. In another embodiment, host bus or network 112 is a network, such as Ethernet, iSCSI, Fiber Channel, SSA, ESCON, ATM, FICON, NVMe, or Infiniband.

Host computer 104 may interface with one or more storage controllers 108, although only a single storage controller 108, is illustrated for clarity. In one embodiment, storage controller 108 is a RAID controller. In another embodiment, storage controller 108 is a storage appliance such as a provisioning, virtualization, replication, or backup appliance. Storage controller 108 may transfer data to and from storage devices 116a, 116b (collectively 116) in storage subsystem 124, over storage device bus 120. Storage device bus 120 may include any suitable storage bus or group of buses for transferring data directly between storage controller 108 and storage devices 116 including, but not limited to, SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 may include various types of storage devices, including hard disk drives, solid state drives, optical drives, and tape drives. Within a specific storage device type, there may be several subcategories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
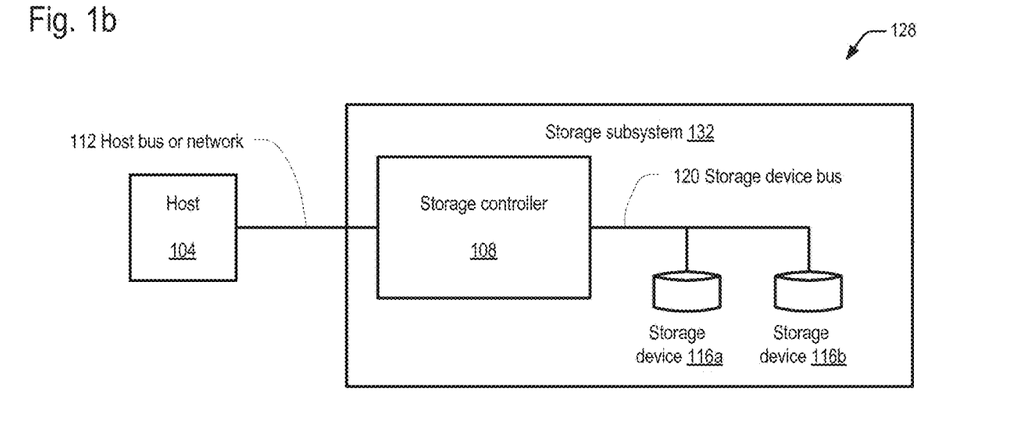
FIG. 1b is a block diagram illustrating components of a second non-host-based data storage system in accordance with embodiments of the present disclosure.

Referring now to FIG. 1b, a block diagram illustrating components of a second non-host-based data storage system 128 in accordance with embodiments of the present disclosure is shown. Non-host-based data storage system 128 is similar to non-host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
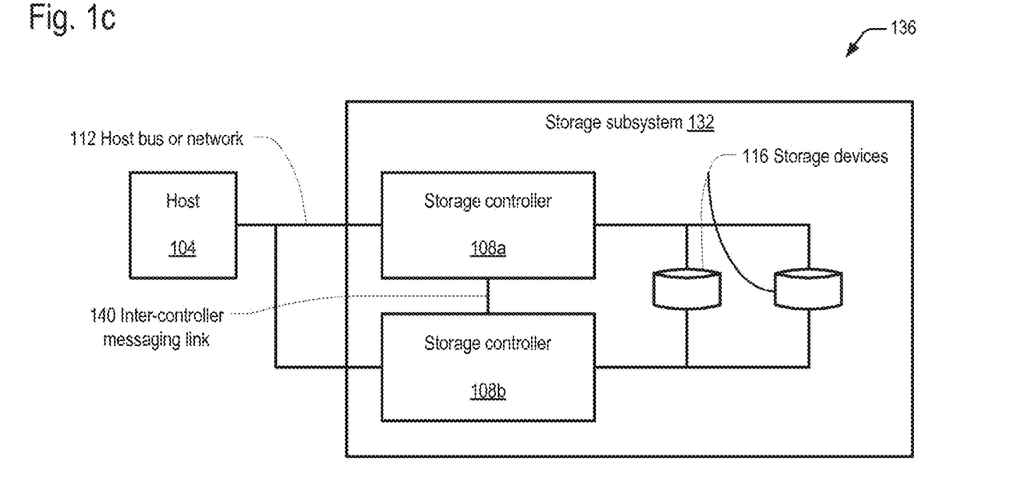
FIG. 1c is a block diagram illustrating components of a third non-host-based data storage system in accordance with embodiments of the present disclosure.

Referring now to FIG. 1c, a block diagram illustrating components of a third host-based data storage system 136 in accordance with embodiments of the present disclosure is shown. Data storage system 136 is similar to data storage systems 100 and 128, except storage controller 108 represents two redundant storage controllers 108a, 108b (collectively 108). In one embodiment, storage controllers 108a, 108b utilize active-active failover to have continued availability to storage devices 116 by host 104 in the event of a failure of one of storage controllers 108a, 108b. Intercontroller messaging link 140 may provide a communication and data path between storage controllers 108a, 108b in order to mirror write data and synchronize failover and failback operations.

Figure 2A:
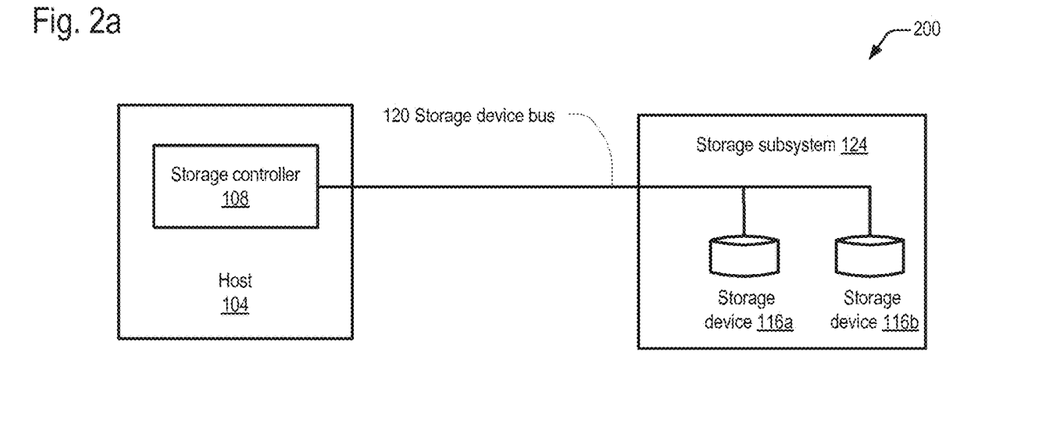
FIG. 2a is a block diagram illustrating components of a first host-based data storage system in accordance with embodiments of the present disclosure.

Referring now to FIG. 2a, a block diagram illustrating components of a first host-based data storage system 200 in accordance with embodiments of the present disclosure is shown. First host-based data storage system 200 is similar to first non-host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, such as Rapid IO, PCI, PCI-X, or PCI Express. Storage controller 108 may be, for example, integrated on the motherboard of host computer 104 or an add-in board or other form of assembly in host computer 104.

Figure 2B:
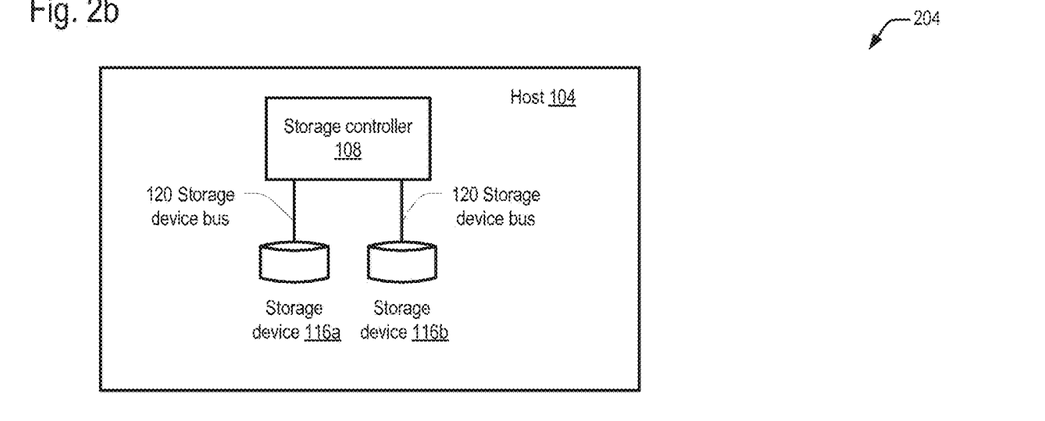
FIG. 2b is a block diagram illustrating components of a second host-based data storage system in accordance with embodiments of the present disclosure.

Referring now to FIG. 2b, a block diagram illustrating components of a second host-based data storage system 204 in accordance with embodiments of the present disclosure is shown. Second host-based data storage system 204 may integrate the functions of storage subsystem 124 into host computer 104. Data storage system 204 represents one example of a self-contained, highly-integrated data-storage system.

Figure 2C:
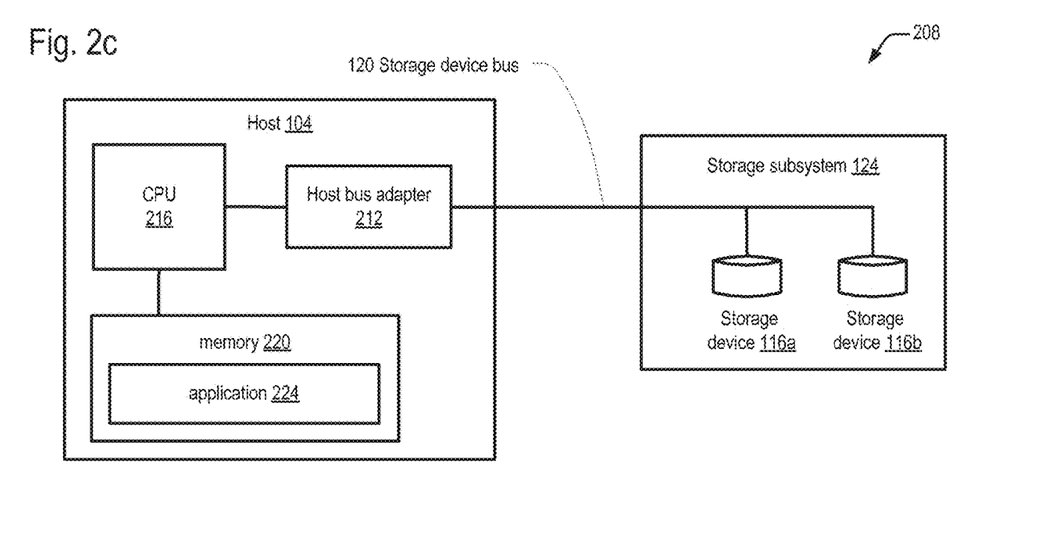
FIG. 2c is a block diagram illustrating components of a third host-based data storage system in accordance with embodiments of the present disclosure.

Referring now to FIG. 2c, a block diagram of illustrating components of a third host-based data storage system 208 in accordance with embodiments of the present disclosure is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Figure 3:
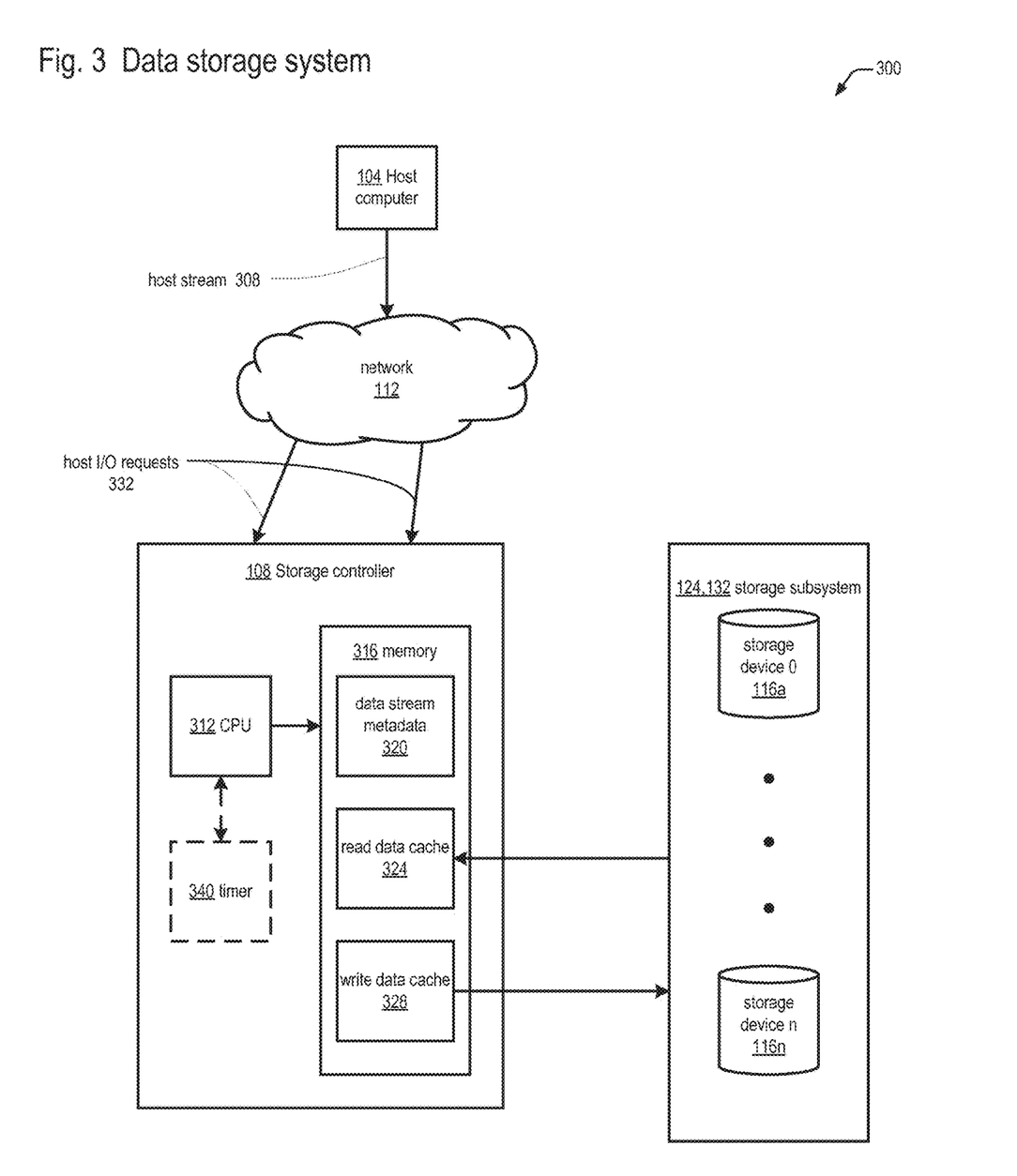
FIG. 3 is a block diagram illustrating a data storage system in accordance with embodiments of the present disclosure.

Referring now to FIG. 3, a block diagram illustrating a data storage system 300 in accordance with embodiments of the present disclosure is shown. Data storage system 300 may include one or more host computers 104 interconnected to a storage controller 108 through bus or network 112. Host computer 104 may generate a host stream 308, which are multiple groups of host I/O requests 332.

Storage controller 108 may include a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may include one or more forms of volatile memory 316, non-volatile memory 316, or a combination of both volatile and non-volatile memories 316. The memory 316 may include firmware which includes program instructions that CPU 312 fetches and executes, including program instructions for the processes of the present disclosure. Examples of non-volatile memory 316 include, but are not limited to, flash memory, SD, EPROM, EEPROM, hard disks, and NVRAM. Volatile memory 316 may store various data structures and user data. Examples of volatile memory 316 include, but are not limited to, SRAM, DDR RAM, DDR2 RAM, DDR3 RAM, Z-RAM, TTRAM, A-RAM, ETA RAM, or other forms of temporary memory.

Memory 316 may include a read data cache 324 and in some embodiments a write data cache 328, which may provide improved read and write performance, respectively, to the host computer 104 compared to existing systems. Memory 316 may also include data stream metadata 320. Data stream metadata 320 stores parameters related to host I/O requests 332 and are used to control sequential I/O operations.

Storage controller 108 may be coupled to storage subsystem 124, 132, which may include one or more storage devices 116a-116n. Frequently accessed data may be read from storage devices 116 into read data cache 324, where it can be provided in response to host read requests 332 much faster than directly from the storage devices 116. Write data may be initially stored in the write data cache 328, which may be much faster than writes sent directly to storage devices 116.

In some embodiments, storage controller 108 includes timers 340. Timers 340 may be hardware timers controlled by CPU 312 or may be software routines that execute on CPU 312. Timers 340 may be configured to measure the time between bursts. Timers 340 may represent any number of timers, and in the present disclosure there may be one timer 340 allocated to each active stream corresponding to each logical volume, VDisk, or storage device 804.

It should be understood that storage controller 108 may be functionally organized in countless different functional organizations and architectures without diverting from the scope or operation of the present disclosure.

Figure 4:
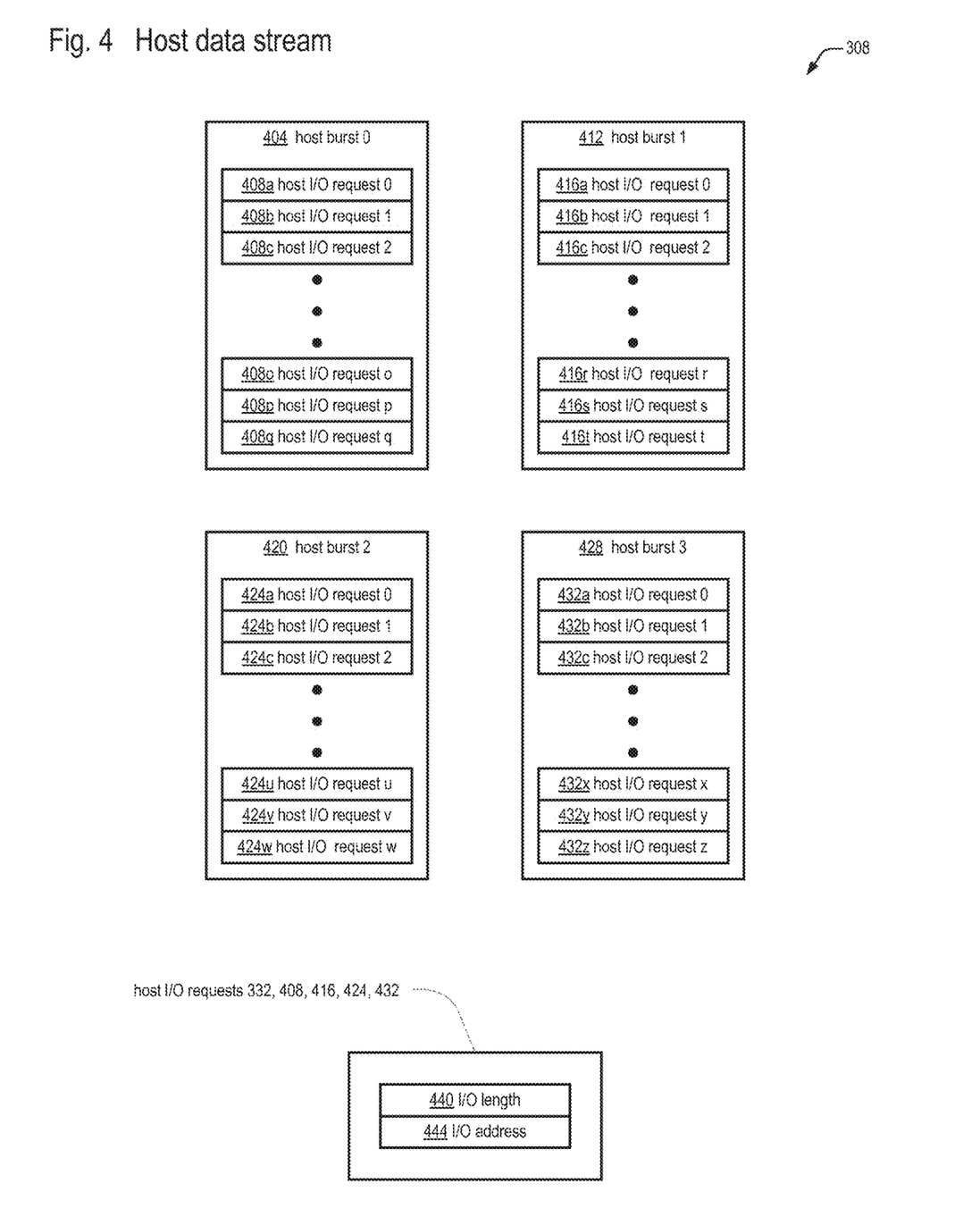
FIG. 4 is a block diagram illustrating a host data stream in accordance with embodiments of the present disclosure.
Figure 5:
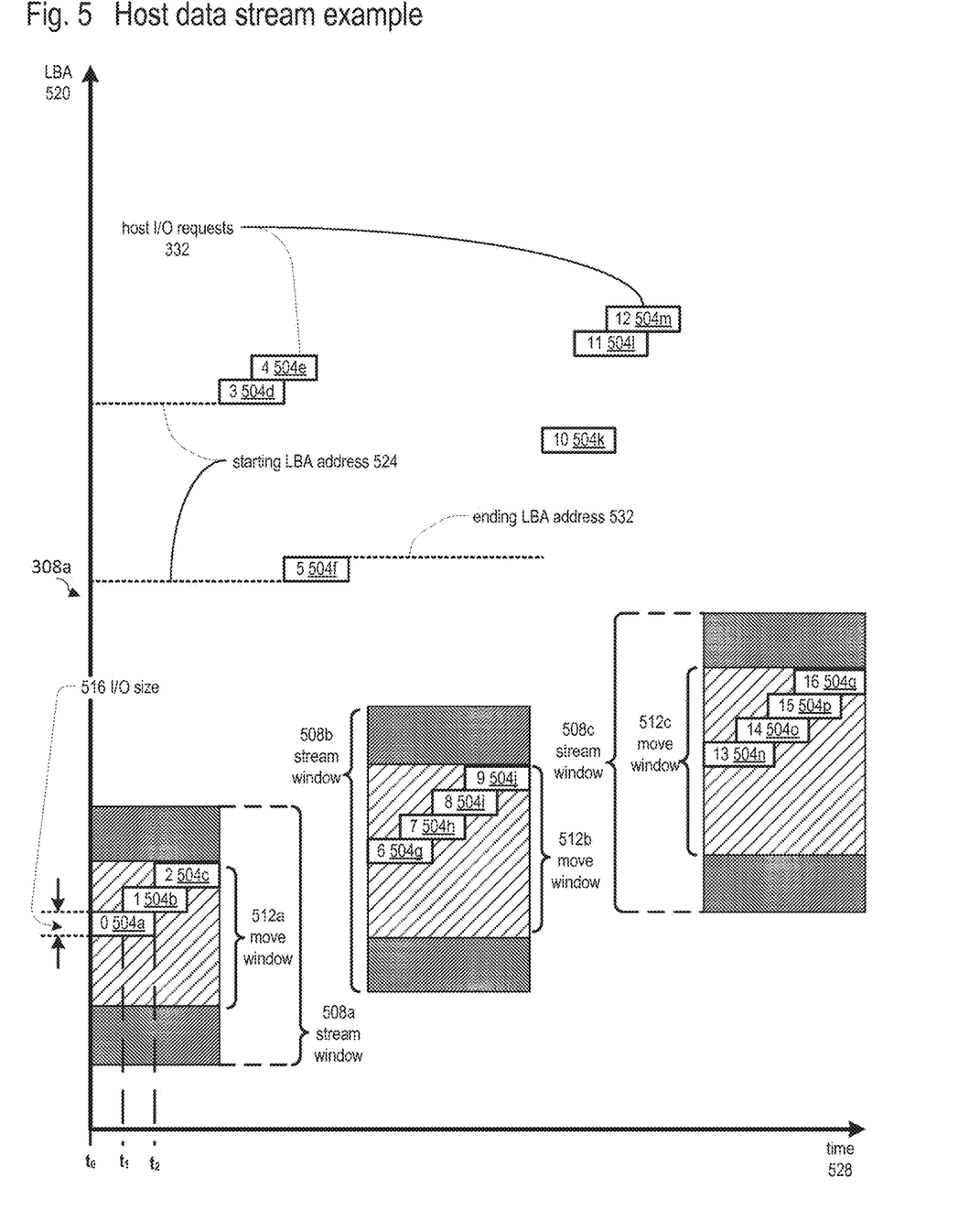
FIG. 5 is a diagram illustrating a first host data stream example in accordance with embodiments of the present disclosure.

The time-based read ahead technique of the present disclosure may also be used with any suitable I/O request stream to provide streaming data. In some embodiments, the I/O request stream may be provided in the form of bursts of host I/O requests (FIG. 4). Non-sequential host I/O requests may be interspersed with the bursts of host I/O requests (FIG. 5). The bursts may be handled in any suitable manner (e.g., FIGS. 6a, 6b, & 7).

Referring now to FIG. 4, a block diagram illustrating a host data stream 308 in accordance with embodiments of the present disclosure is shown. Host data stream 308 includes groups of consecutive host I/O requests 332, which are known as bursts or host bursts. Although host data stream 308 may include any number of bursts or host bursts, four host bursts are shown: host burst 0 404, host burst 142, host burst 2 420, and host burst 3 428. Each host burst 404, 412, 420, 428 may include the same or a different number of host I/O requests 332. Host burst 0 404 includes host I/O request 0 408a through host I/O request q 408q. Host burst 1 412 includes host I/O request 0 416a through host I/O request t 416t. Host burst 2 420 includes host I/O request 0 424a through host I/O request w 424w. Host burst 3 428 includes host I/O request 0 432a through host I/O request z 432z.

Each host I/O request 332, 408, 416, 424, and 432 may have, or define, an I/O length 440 and an I/O address 444. I/O length 440 is the number of blocks or bytes to be read from or written to storage devices 116, and the I/O address 444 is the starting address the host I/O request 332, 408, 416, 424, and 432 will be directed to.

Referring now to FIG. 5, a diagram illustrating a first host data stream 308a example in accordance with embodiments of the present disclosure is shown. Host data stream 308a may include multiple host I/O requests 332 received over time 528, where the host I/O requests 332 are individually identified as host I/O requests 504. FIG. 5 illustrates a first burst of sequential host I/O requests 504a, 504b, and 504c, a second burst of sequential host I/O requests 504g, 504h, 504i, and 504j, and a third burst of sequential host I/O requests 504n, 504o, 504p, and 504q. Storage controller 108 may receive other non-sequential host I/O requests during the time that the three bursts of sequential I/O requests are received, and the non-sequential host I/O requests are identified as I/O requests 504d, 504e, 504f, 504k, 504l, and 504m.

Each host I/O request 504 may have, or define, an associated I/O size 516, and for simplicity in this example, all I/O requests 504 are shown with the same I/O size 516. Additionally, each I/O request 504 may be addressed to a logical block addressing (LBA) range 520, including a starting LBA Address 524 and an ending LBA address 532. The storage controller 108 may receive each I/O request 504 at a specific time 528. For example, the storage controller 108 receives sequential host I/O request 0 504a at time $t_0$, sequential host I/O request 1 504b at time $t_1$, and sequential host I/O request 2 504c at time $t_2$.

The storage controller 108 may determine if each received host I/O request 504 is either sequential or non-sequential. For sequential host I/O requests 504, the storage controller 108 may establish both a stream window 508 and move window 512, where the move window 512 represents an LBA range 520 that is smaller than the LBA range 520 used for the stream window 508 and contained within the boundaries of the stream window 508. The stream window 508 may establish the LBA limits for the current stream 308a, while the storage controller 108 may use the move window to determine when the move window 512 and stream window 508 boundaries need to change. If a sequential host I/O request 504 is within a stream window 508, but outside the move window 512 corresponding to the stream window 508, the move window 512 and stream window 508 boundaries may be changed. This technique may keep sequential I/O requests 504 for the same stream 308a within a move window 512 and stream window 508.

The storage controller 108 may initially establish the move window 512a based on LBAs of sequential I/O requests 504a, 504b, and 504c. I/O requests 504d, 504e, and 504f may be outside both move window 512a and stream window 508a, which may indicate to storage controller 108 that the move window 512 and stream window 508 may need to change. The storage controller 108 next many establish that I/O requests 504g, 504h, 504i, and 504j are sequential I/O requests 504, and may change the move window 512 to have the boundaries of move window 512b and the stream window 508 to have the boundaries of stream window 508b. I/O requests 504k, 504l, and 504m may be outside both move window 512b and stream window 508b, which may indicate to storage controller 108 that the move window 512 and stream window 508 may need to change. The storage controller 108 next may establish that I/O requests 504n, 504o, 504p, and 504q are sequential I/O requests 504, and may change the move window 512 to have the boundaries of move window 512c and the stream window 508 to have the boundaries of stream window 508c. Various existing processes that track move window 512 and stream window 508 boundaries may be used.

Figure 6A:
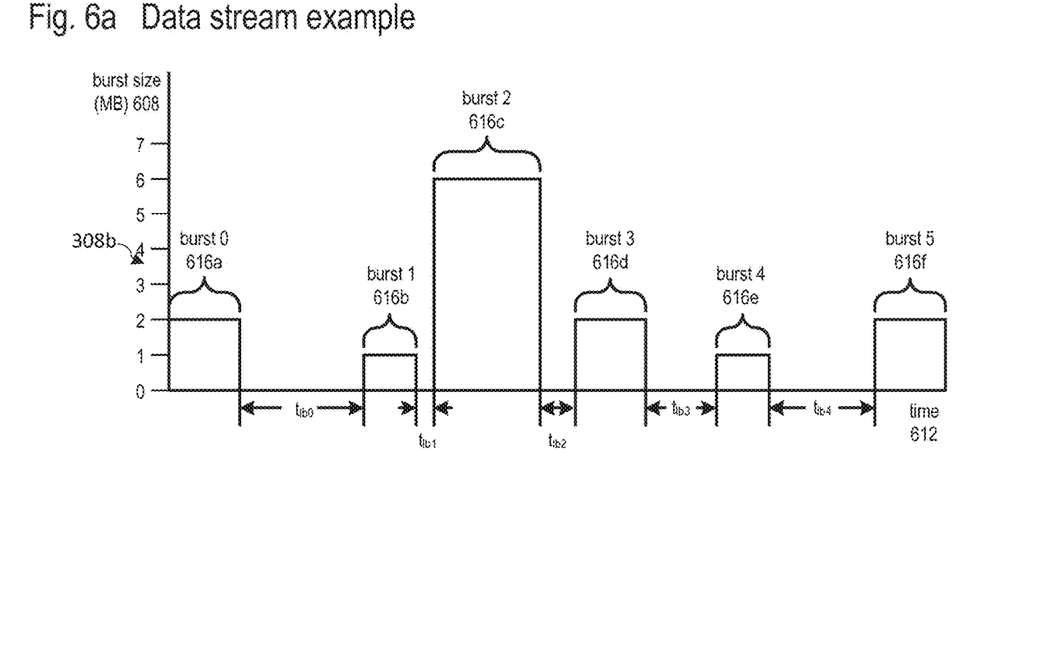
FIG. 6a is a diagram illustrating a second host data stream example in accordance with embodiments of the present disclosure.

Referring now to FIG. 6a, a diagram illustrating a second host data stream 308b example in accordance with embodiments of the present disclosure is shown. A group of 6 bursts 616 are shown received over time 612 by a storage controller 108, with burst size 608 in Megabytes (MB) shown for each burst 616. The example illustrated in FIG. 6 a depicts 6 bursts of sequential host I/O requests 332, identified as burst 0 616a, burst 1 616b, burst 2 616c, burst 3 616d, burst 4 616e, and burst 5 616f.

The time between bursts $t_{1b}$ is shown between every two consecutive bursts 616. The time between burst 0 616a and burst 1 616b is $t_{1b0}$. The time between burst 1 616b and burst 2 616c is $t_{1b1}$. The time between burst 2 616c and burst 3 616d is $t_{1b2}$. The time between burst 3 616c and burst 4 616d is $t_{1b3}$. Finally, the time between burst 4 616d and burst 5 616e is $t_{1b4}$.

Figure 6B:
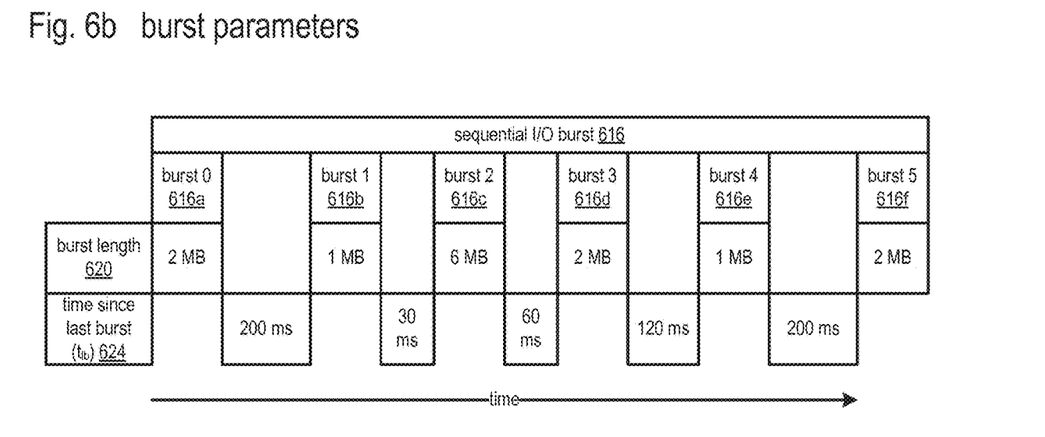
FIG. 6b is a diagram illustrating burst parameters in accordance with embodiments of the present disclosure.

Referring now to FIG. 6b, a diagram illustrating burst parameters in accordance with embodiments of the present disclosure is shown. FIG. 6b references the example of FIG. 6a to illustrate burst parameters stored in metadata memory 320.

Each burst 616 has an associated burst length 620 parameter, with burst 0 616a having a burst length 620 of 2 MB, burst 1 616b having a burst length 620 of 1 MB, burst 2 616c having a burst length 620 of 6 MB, burst 3 616d having a burst length 620 of 2 MB, burst 4 616e having a burst length 620 of 1 MB, and burst 5 616f having a burst length 620 of 2 MB. Between each burst 616 is a time since last burst $t_{1b}$ 624. $T_{1b0}$ is 200 ms, $T_{1b1}$ is 30 ms, $T_{1b2}$ is 60 ms, $T_{1b3}$ is 120 ms, and $T_{1b4}$ is 200 ms.

Figure 7:
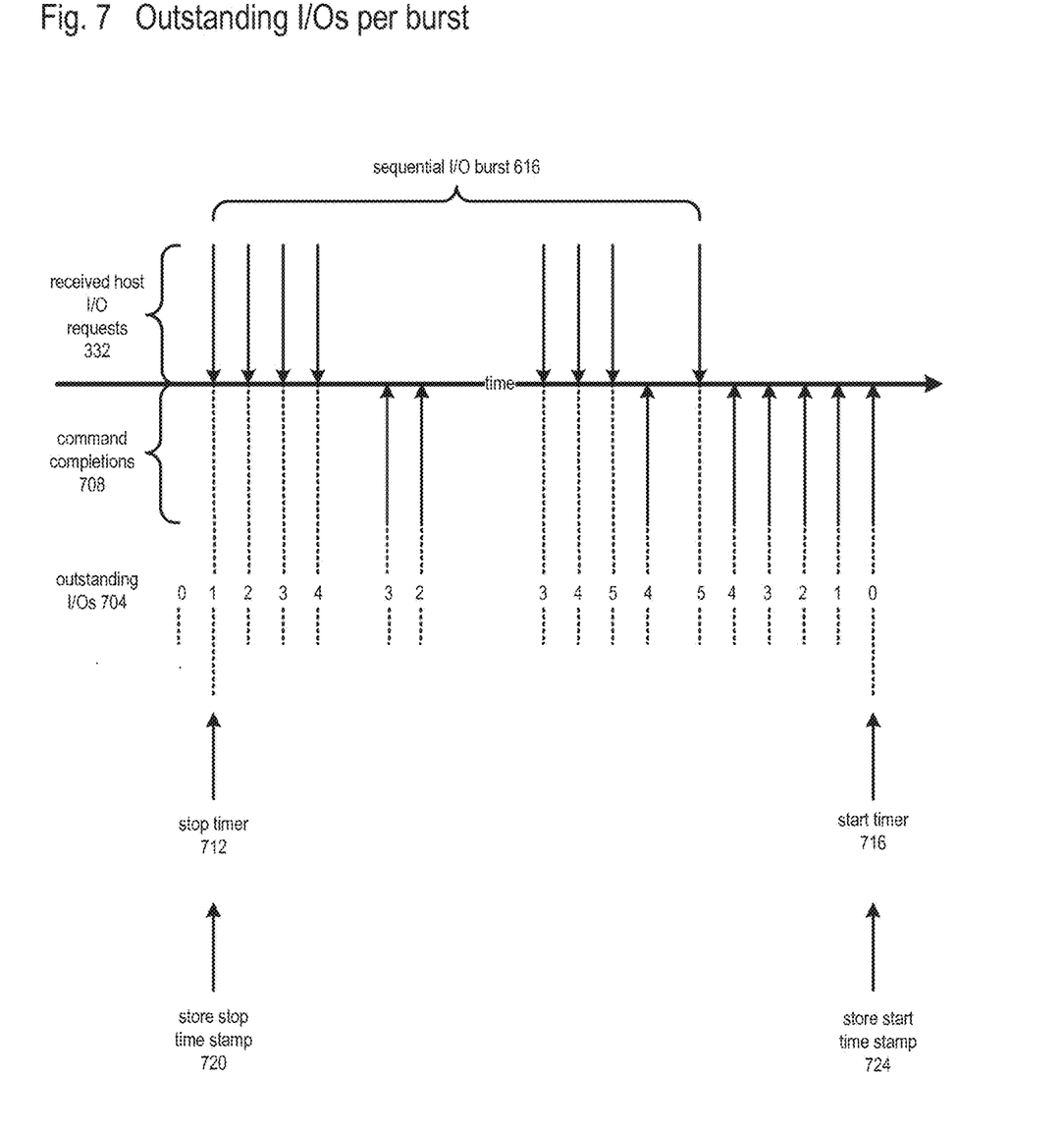
FIG. 7 is a diagram illustrating outstanding I/Os per burst in accordance with embodiments of the present disclosure.

Referring now to FIG. 7, a diagram illustrating outstanding I/Os per burst 616 in accordance with embodiments of the present disclosure is shown. FIG. 7 illustrates the practical interaction of various parameters over time of the present disclosure for a burst 616 of host I/O requests 332. For simplification purposes, it is assumed that the I/O length 440 for all host I/O requests 332 is '1' (a block, for example).

Prior to a first host I/O request 332 for the burst 616, the outstanding I/Os 704 may be zero. When the storage controller 108 receives a first host I/O request 332 for the burst 616, the outstanding I/Os 704 may become '1' to reflect the size of the first host I/O request 332 and, for example, either the timer 340 may be stopped 712 in a first embodiment, or else a stop time stamp 720 may be stored in a second embodiment.

The storage controller 108 may adjust the outstanding I/Os 704 as more host I/O requests 332 are received. However, when command completions 708 occur, the storage controller 108 may decrease the outstanding I/Os 704 by the size of each completed host I/O request 708. Once the outstanding I/Os 704 returns to zero (indicating the end of the current burst 616), the storage controller 108 may either start the timer 716 in the first embodiment or store the start time stamp 724 in metadata memory 320 in the second embodiment. This sequence of operations may then be repeated for each subsequent burst 616.

As described herein, the time ahead duration may depend on storage subsystem parameters. The system configuration may include one or more logical volumes, VDisks, or storage devices, which may be used in determining the appropriate time ahead duration.

Referring now to FIG. 8, a diagram illustrating logical volume, VDisk, and storage device metadata 808 in accordance with embodiments of the present disclosure is shown. Sequential host I/O requests 332, 504 may be directed to either logical volumes, VDisks, or storage devices 116, and storage controller 108 has one or more logical volumes, VDisks, or storage devices 116. FIG. 8 illustrates a system where a storage controller 108 has five logical volumes, VDisks, or storage devices 116, identified as 804a through 804e.

Each logical volume, VDisk, or storage device 804 may have corresponding logical volume, VDisk, or storage device metadata set 808a, and each metadata set 808 may be managed independently from the other metadata sets 808. In some embodiments, the storage controller 108 may track approximately 1,000 logical volumes, VDisks, or storage devices 804, 65 sequential I/O streams 308 for the first 32 logical volumes, VDisks, or storage devices 804, and 4 sequential I/O streams 308 for the any logical volumes, VDisks, or storage devices 804 beyond the first 32 logical volumes, VDisks, or storage devices 804.

In an alternative embodiment, there may be common pool of active streams available to all logical volumes, VDisks, or storage devices 804, instead of an active stream list allocated to each logical volume, VDisk, or storage device 804. This may provide additional flexibility in assigning or limiting streams to each logical volume, VDisk, or storage device 804, but may result in additional management complexity.

FIG. 9 shows one example of a normalized graph 900 of data streamed versus time when a data storage system uses time-based read ahead. Graph 900 shows a host read time plot 902 and data storage subsystem read time plot 904.

Each frame of data in a stream may generate multiple I/O requests to a data storage subsystem. As illustrated, each time plot 902, 904 is organized into clusters 920 of horizontal lines. Each horizontal line represents the time needed to stream data in response to a single I/O request, and each cluster 920 represents the I/O requests that correspond to a frame of data. In other words, for the host read time plot 902, the horizontal lines in each cluster 920 represent the time needed to read each I/O request from cache memory in the data storage subsystem. For the data storage subsystem read time plot 904, the horizontal lines in each cluster 920 represent the time needed to reach each I/O request from a storage device into cache memory.

The duration or length of a frame may depend on the desired framerate of the stream. At 30 frames per second (fps), the duration of the frame is 33.3 ms. At 60 fps, the duration of the frame is 16.67 ms. Without using read ahead, a user may experience a glitch, for example, in the playback of a video stream when a frame takes longer to read than the fps-based frame duration.

As can be seen, different I/O requests may require different amounts of time to stream data as represented by the different line lengths, even within each frame or cluster 920. One group 910 of clusters 920 represents data storage subsystem read times that have a duration longer than one frame. For example, at least one horizontal line in the group 910 extends past the start time of the next frame or cluster 920. Without a read ahead, performance of the stream would typically be affected, but as shown, the corresponding host read times are unaffected by the group 910.

Line 908, which horizontally connects one cluster 920 from the host read time plot 902 and one cluster 920 from data storage subsystem read time plot 904, represents a read ahead time. The data storage subsystem caches data associated with a particular I/O request from the host ahead of the host retrieving the cached data by a duration represented by the length of line 908. The length of line 908 represents a time ahead duration, or simply "time ahead." The two clusters 920 connected by line 908 are associated with the same I/O request from the host. In general, when the time head represented by the length of line 908 is longer in duration than the longest horizontal line in data storage subsystem read time plot 904, for example, as shown in group 910, then performance of the stream may not be affected. The time ahead duration is capable of covering the inconsistent latencies in the data storage system.

In some embodiments, the time ahead duration may be about 50, 100, 150, 200, 300, 400, or 500 ms. In some embodiments, the streaming speed may be about 100, 200, 500, 1000, or 1500 MB/s. In some embodiments, the read ahead size may be about 10, 20, 50, 100, or 150 MB.

Line 906, which vertically connects host read time plot 902 and data storage subsystem read time plot 904, represents a read ahead size, which is the amount of streamed data associated with the read ahead time represented by line 908. For example, when the read ahead time represented by the length of line 908 is Y, the system may determine the read ahead size X based on the current speed of the I/O stream V according to X=V×Y. In this manner, the read ahead size X is increased or decreased to an appropriate size based on the current stream speed.

The speed of the I/O stream V may be continuously updated after the stream has started. In some embodiments, the read ahead size may not be determined until a short delay after the stream has started and stabilized.

FIG. 10 is one example of a flowchart of method 920 of using a time-based read ahead in a data storage system. Method 920 may include determining whether an I/O request stream has been received in block 922. For example, a data storage subsystem may continue to check whether an I/O request stream has been received from a host system (NO) until an I/O request stream has been received (YES). When an I/O request stream has been received, method 920 may determine a current streaming rate in block 926. For example, the data storage subsystem may determine a current streaming rate based on information from the I/O request stream or from user input. In block 924, a time ahead duration may be determined. In some embodiments, the time ahead duration may be determined independently of the current streaming rate. In some embodiments, the time ahead duration may be determined before, during, or after receiving an I/O request stream. The data storage subsystem may determine a time ahead duration based on information from the I/O request stream or from user input.

In block 928, a time-ahead read ahead size may be determined based on the time ahead duration and current streaming rate determined in blocks 924 and 926. For example, the read ahead size may be the product of multiplying time ahead duration with current streaming rate. As a result, the time-based read ahead size may variable in response to a static time ahead duration and a variable current streaming rate. For example, for a 1100 MB/s streaming speed (e.g., for 4K video) and a time ahead duration of 100 ms, the read ahead size may be 110 MB.

Method 920 may provide streaming data in response to the I/O request stream in block 930, for example, using the time-based read ahead size to improve performance of the stream.

FIG. 11 is one example of a schematic flowchart of method 940 of using time-based read ahead in a data storage system. In particular, method 940 may be used in lieu of blocks 922, 924, 926, and 928 in method 920 (FIG. 10).

Method 940 may include determining whether an I/O request stream has been received in block 922. For example, a data storage subsystem may continue to check whether an I/O request stream has been received from a host system (NO) until an I/O request stream has been received (YES). When an I/O request stream has been received, method 940 may wait a predetermined delay after beginning to receive the I/O request stream in block 948. For example, method 940 may wait to determine and use the time-based read ahead until after the stream has stabilized (e.g., after 1, 2, 3, 4, 5, or 10 seconds). As another example, method 940 may wait to begin gathering data using the time-based read ahead until after the delay (e.g., a timer has expired). Although the block of method 940 may be arranged in various orders, block 948 in particular may be performed at any suitable time within method 940 to determine a time-based read ahead size based on a stabilized stream. Further, in particular, block 948 may be omitted in some embodiments. For example, method 940 may continue to block 950 or another block without a wait (e.g., immediately subsequent).

In block 950, a rate of I/O requests and one or more I/O sizes associated with the I/O request stream may be determined. In some embodiments, the rate of I/O requests and one or more I/O sizes may be determined based on data stream metadata. In block 952, the current streaming rate may be determined based on the I/O request rate and the one or more I/O sizes.

Method 940 may also include determining one or more streaming parameters in block 942. Examples of streaming parameters include, but are not limited to, a target stream quality, a target frame rate, a user input, an encoding scheme, a type of file, and a compression configuration. In some embodiments, streaming parameters may be determined based on data stream metadata.

The target stream quality may represent a user's sensitivity to latency. The target stream quality may be based on, for example, a selectable user sensitivity to latency (e.g., user input) or a population average sensitivity to latency (e.g., default setting).

The time ahead duration may be longer for a target stream quality of 99.999% of frames without a performance issue compared to a target stream quality of 99%. Further, a longer time ahead duration may be used for a faster target frame rate. Also, a user may directly input a time ahead duration (e.g., desired delay) or some other measure of sensitivity to latency (e.g., high quality, medium quality, low quality, etc.). The encoding scheme, file type, or compression configuration may influence the bitrate or speed of the stream. A longer time ahead duration may be used for a greater variance in bitrate.

In block 944, one or more storage subsystem parameters may be determined. Examples of storage subsystem parameters include, but are not limited to, a system configuration, a system latency, and a latency probability.

The system configuration may include, for example, the type of storage drives used, the speed of the storage drives, or the amount of cache memory. The time ahead duration may be longer for a system using hard disk drives than solid state drives. Further, the time ahead duration may be longer for a slower spinning hard disk drive than a faster spinning hard disk drive. Also, the time ahead duration may be longer for a smaller amount of cache then for a larger amount of cache. In general, a longer time ahead duration may be used to compensate for a longer system latency and/or a less predictable latency probability (e.g., a large variance). The system latency may be based on an observed I/O request latency.

One example of a latency probability is a tail latency. A tail latency may be based on one or more latencies of the data storage subsystem. A tail latency may be determined using a 9's calculation. The number of 9's guaranteed may be used to determine the time ahead duration. In some embodiments, the time ahead duration may be set to a value equal to or greater than the tail latency.

In block 946, a time ahead duration may be determined based on one or more streaming parameters and/or one or more storage subsystem parameters. For example, a user may select a target stream quality to have a certain probability desired of not dropping frames and/or a system latency may be based on an observed latency of one or more storage devices. In some embodiments, the time ahead duration may be determined independently of the current streaming rate. For example, blocks 942, 944, and 946 may be performed independently of performing block 950 and 952. In some embodiments, the time ahead duration may be determined before, during, or after receiving an I/O request stream.

In block 954, the initial time-based read ahead size may be determined. For example, the time-based read ahead size may be determined based on the current streaming rate and the time ahead duration time ahead duration determined in block 952 and 946. The time-based read ahead size may be determined while streaming data, particularly when a wait in block 948 is used. In block 956, the time-based read ahead size may be updated. For example, method 940 may return to one or more of blocks 950, 952, 942, 944, or 946. As illustrated, method 940 returns to blocks 950 and 942. In some embodiments, the time-based read ahead size may be updated once every one, two, three, or more I/O requests, frames, bursts, or other events. The interval between updates may also change based on the streaming or storage subsystem parameters.

In general, using a time ahead duration allows the system to be configured to cache streaming data ahead of a host stream by a set amount of time (e.g., Y seconds). This time ahead duration can be selected to compensate for the maximum storage device or storage system latency as desired (e.g., longer or shorter). This technique advantageously adapts to the initial speed of the stream and can be updated during the stream. Using a time ahead duration may be more directly and elegantly produce the desired performance of a stream based on the latencies of a data storage subsystem.

Thus, various embodiments of DATA STORAGE SYSTEMS USING TIME-BASED READ AHEAD are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 2, 3, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a controller may be operably coupled to a storage device to transfer data therebetween).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

The term "and/or" means one or all the listed elements or a combination of at least two of the listed elements.

The phrases "at least one of," "comprises at least one of," and "one or more of" followed by a list refers to any one of the items in the list and any combination of two or more items in the list.

What is claimed is:

1. A data storage system comprising:
   a host system configured to provide an I/O request stream comprising a plurality of I/O requests; and
   a data storage subsystem comprising a data storage device and a processor configured to:
      provide streaming data to the host system in response to the I/O request stream;
      determine a current streaming rate of the I/O request stream;
      determine a time-based read ahead size based on a time ahead duration and the current streaming rate of the I/O request stream; and
      set a read ahead cache size of the data storage subsystem to buffer the streaming data in memory based on the time-based read ahead size.

2. The system of claim 1, wherein the time-based read ahead size is variable in response to the time ahead duration being static and the current streaming rate being variable.

3. The system of claim 1, wherein the processor is further configured to update the current streaming rate while providing streaming data based on the I/O request stream.

4. The system of claim 1, wherein the processor is further configured to wait a predetermined delay after beginning to receive the I/O request stream to determine the time-based read ahead size.

5. The system of claim 1, wherein the processor is further configured to determine the time ahead duration based on a streaming parameter, the streaming parameter based on one or more of: a target stream quality, a target frame rate, a user input, an encoding scheme, a type of file, and a compression configuration.

6. The system of claim 1, wherein the processor is further configured to determine the time ahead duration based on a storage subsystem parameter, the storage subsystem parameter based on one or more of: a system configuration, a system latency, and a latency probability.

7. The system of claim 1, wherein the processor is further configured to:
   determine a rate of I/O requests and one or more I/O sizes associated with the I/O request stream; and
   determine the current streaming rate of the I/O request stream based on the time ahead duration, the rate of I/O requests, and the one or more I/O sizes.

8. The system of claim 1, wherein the processor further configured to:
   determine a tail latency based on one or more latencies of the data storage subsystem; and
   set the time ahead duration to a value equal to or greater than the tail latency.

9. The system of claim 1, wherein the time ahead duration is less than or equal to 500 milliseconds.

10. A method comprising:
    providing data to a host system in response to an I/O request stream comprising a plurality of I/O requests;
    determining a current streaming rate of the I/O request stream;
    determining a time-based read ahead size based on a predetermined time ahead duration and the current streaming rate of the I/O request stream; and
    setting a read ahead cache size of a data storage subsystem to buffer the streaming data in memory based on the time-based read ahead size.

11. The method of claim 10, wherein the time-based read ahead size is variable in response to the time ahead duration being static and the current streaming rate being variable.

12. The method of claim 10, further comprising updating the current streaming rate while providing streaming data based on the I/O request stream.

13. The method of claim 10, further comprising waiting a predetermined delay in response to receiving the I/O request stream to determine the time-based read ahead size.

14. The method of claim 10, further comprising determining the time ahead duration based on a streaming parameter, the streaming parameter based on one or more of: a target stream quality, a target frame rate, a user input, an encoding scheme, a type of file, and a compression configuration.

15. The method of claim 10, further comprising determine the time ahead duration based on a storage subsystem parameter, the storage subsystem parameter based on one or more of: a system configuration, a system latency, and a latency probability.

16. A data storage subsystem comprising:
    a data storage device comprising data; and
    a processor configured to:
       provide data to a host system in response to an I/O request stream comprising a plurality of I/O requests;
       determine a current streaming rate of the I/O request stream;
       determine a time-based read ahead size based on a predetermined time ahead duration and the current streaming rate of the I/O request stream; and
       set a read ahead cache size of the storage subsystem to buffer the streaming data in memory based on the time-based read ahead size.

17. The system of claim 16, wherein the time-based read ahead size is variable in response to the time ahead duration being static and the current streaming rate being variable.

18. The system of claim 16, wherein the processor is further configured to update the current streaming rate while providing streaming data based on the I/O request stream.

19. The system of claim 16, wherein the processor is further configured to wait a predetermined delay after beginning to receive the I/O request stream to determine the time-based read ahead size.

20. The system of claim 16, wherein the processor is further configured to determine the time ahead duration based on a streaming parameter, the streaming parameter based on one or more of: a target stream quality, a target frame rate, a user input, an encoding scheme, a type of file, and a compression configuration.

21. The system of claim 16, wherein the processor is further configured to determine the time ahead duration based on a storage subsystem parameter, the storage subsystem parameter based on one or more of: a system configuration, a system latency, and a latency probability.

* * * * *